United States Patent [19]

Bush et al.

[11] Patent Number: 4,785,433

[45] Date of Patent: Nov. 15, 1988

[54] PET WATCH PROCESS AND CIRCUIT

[76] Inventors: George Bush, 1675 York Ave., Suite 34B, New York, N.Y. 10128; Estelle Ross, 41 Buxton St., Lido Beach, N.Y. 11561

[21] Appl. No.: 145,462

[22] Filed: Jan. 19, 1988

[51] Int. Cl.[4] .................. G04F 8/00; A01K 15/00
[52] U.S. Cl. ................................ 368/109; 368/250; 119/29
[58] Field of Search ................ 368/10, 72–74, 368/250, 251; 119/29

[56] References Cited

U.S. PATENT DOCUMENTS

| | | | |
|---|---|---|---|
| 3,980,051 | 9/1976 | Fury | 119/29 |
| 4,202,293 | 5/1980 | Gonda et al. | 119/29 |
| 4,352,169 | 9/1982 | Asano | 368/250 |
| 4,376,992 | 3/1983 | Alzawa | 368/250 |
| 4,483,626 | 11/1984 | Noble | 368/73 |

Primary Examiner—Vit W. Miska
Attorney, Agent, or Firm—Kane, Dalsimer, Sullivan, Kurucz, Levy, Eisele & Richard

[57] ABSTRACT

A pet watch process and circuit discloses the use of an animal carried timer that gives audio signal after a preset time has elapsed. The timer is used in conjunction with a conditioning program to produce a desired motive behavior, e.g., to induce an animal to come home when the audio signal sounds. The timer is incremently adjustable and has a liquid crystal display. The conditioning method is an incremental process which begins with the owner calling the pet and sounding the alarm simultaneously with the pet in the same room, after longer and longer incremental time intervals, and finally is set off with the pet remote from its owner. (i.e. outside the house) As the training process proceeds, the alarm is set off.

1 Claim, 3 Drawing Sheets

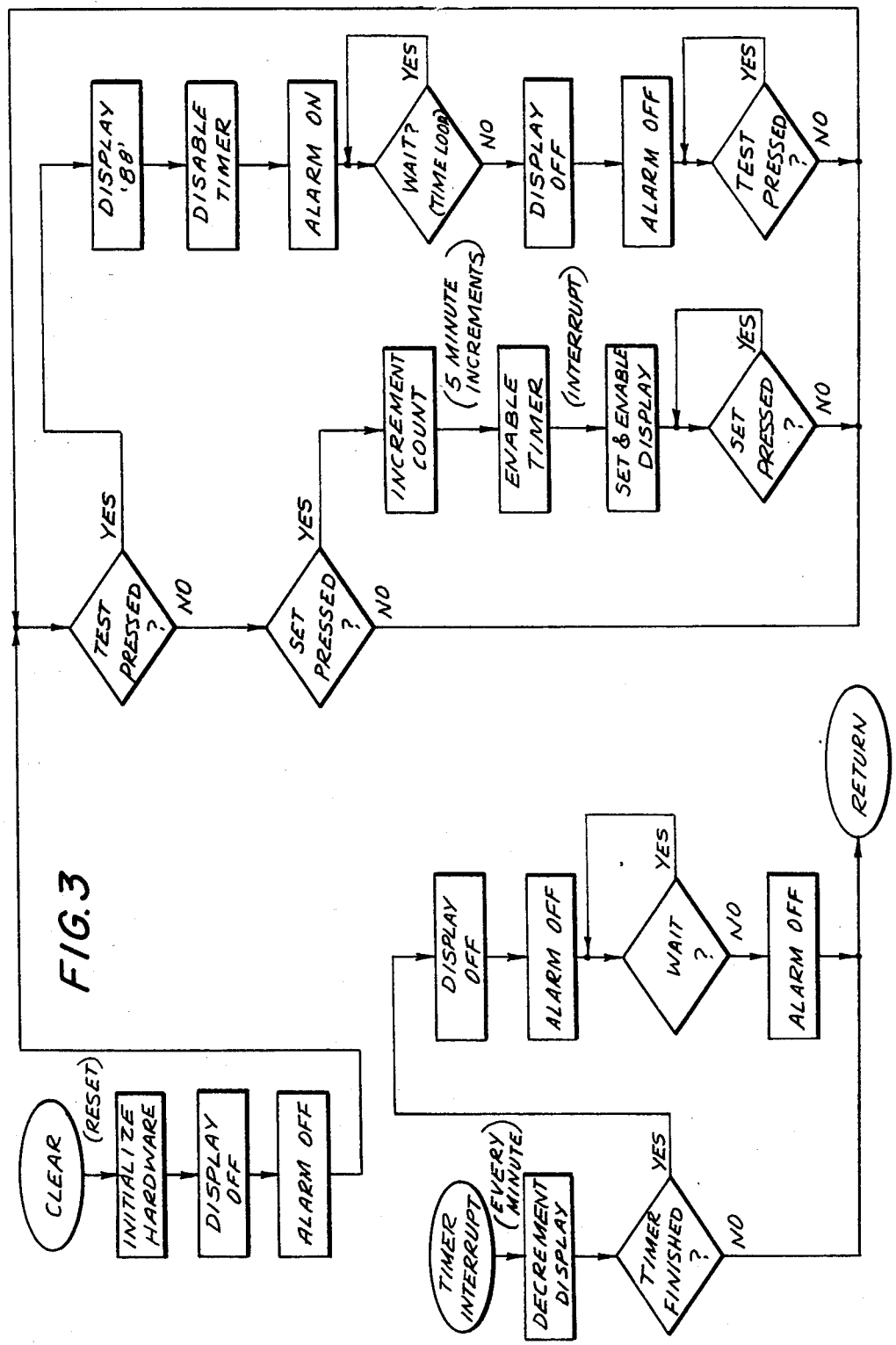

PET WATCH PROCESS AND CIRCUIT

BACKGROUND OF THE INVENTION

1. Field of the Invention

The invention relates to a method and circuit for an animal carried timer that gives an audio signal after a preset time has elapsed.

2. Description of the Prior Art

Obviously the communication of complex ideas to pets or other domestic animals is problematic. For instance, one cannot tell a dog to be back in twenty minutes, let the dog out and expect it to return at the desired time.

A prior art reference which addresses the aforementioned problem is found in U.S. Pat. No. 3,589,337 which discloses a method whereby the owner transmits shocks to the animal to achieve the desired behavior.

Other references which are of some relevance to the present invention include U.S. Pat. Nos. 3,823,691; 3,980,051; 4,202,293; 4,234,876; 4,335,682; 4,539,937; 4,627,385.

SUMMARY OF THE INVENTION

The present invention comprises a method and circuit wherein a digital timer is placed on an animal's collar or other piece of apparel. The pet is then conditioned to return to the desired location when the signal sounds. Such conditioning of the pet need not be complex, particularly if the conditioning program is based on reward such as "treats".

One of the features of the timer of the present invention is that it is both rugged and waterproof.

BRIEF DESCRIPTION OF THE DRAWINGS

FIG. 3 is an upper level flow diagram of software which can be used implement the present invention.

DESCRIPTION OF THE PREFERRED EMBODIMENT

Figure 1A:
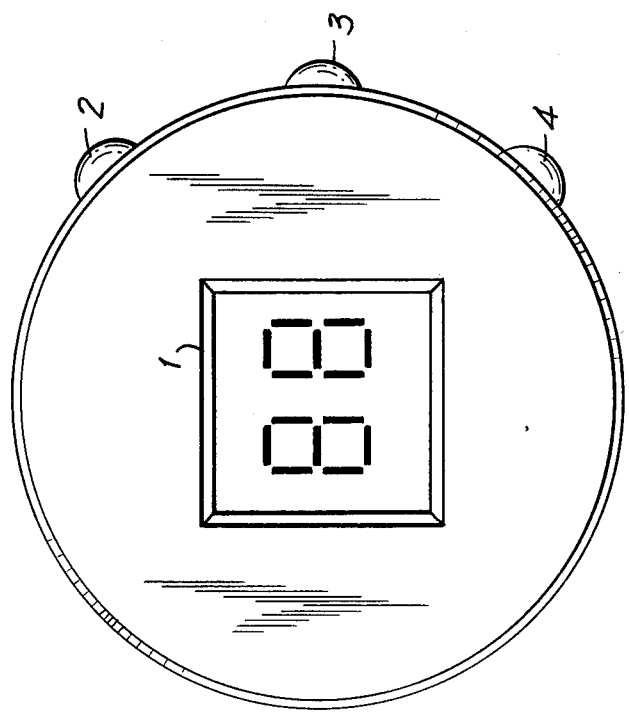
FIG. 1(a) is a front elevational view of the timer of the present invention.

FIG. 1(a) shows a front elevational view of the timer with a liquid crystal digital readout 1, and control buttons 2, 3, and 4. The control buttons 2, 3, and 4 can be sealed behind flexible membranes to exclude water and dirt.

Figure 1B:
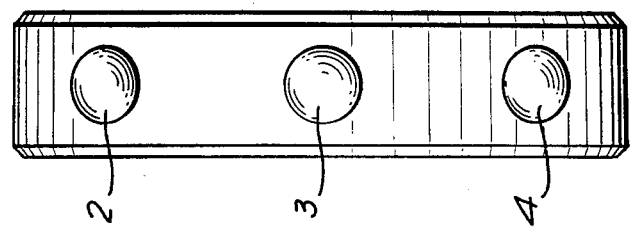
FIG. 1(b) is a side elevational view of the timer shown in FIG. 1(a).

FIG. 1(b) is a side elevational view of the timer of FIG. 1(a) with like elements having the same reference numerals.

Figure 2:
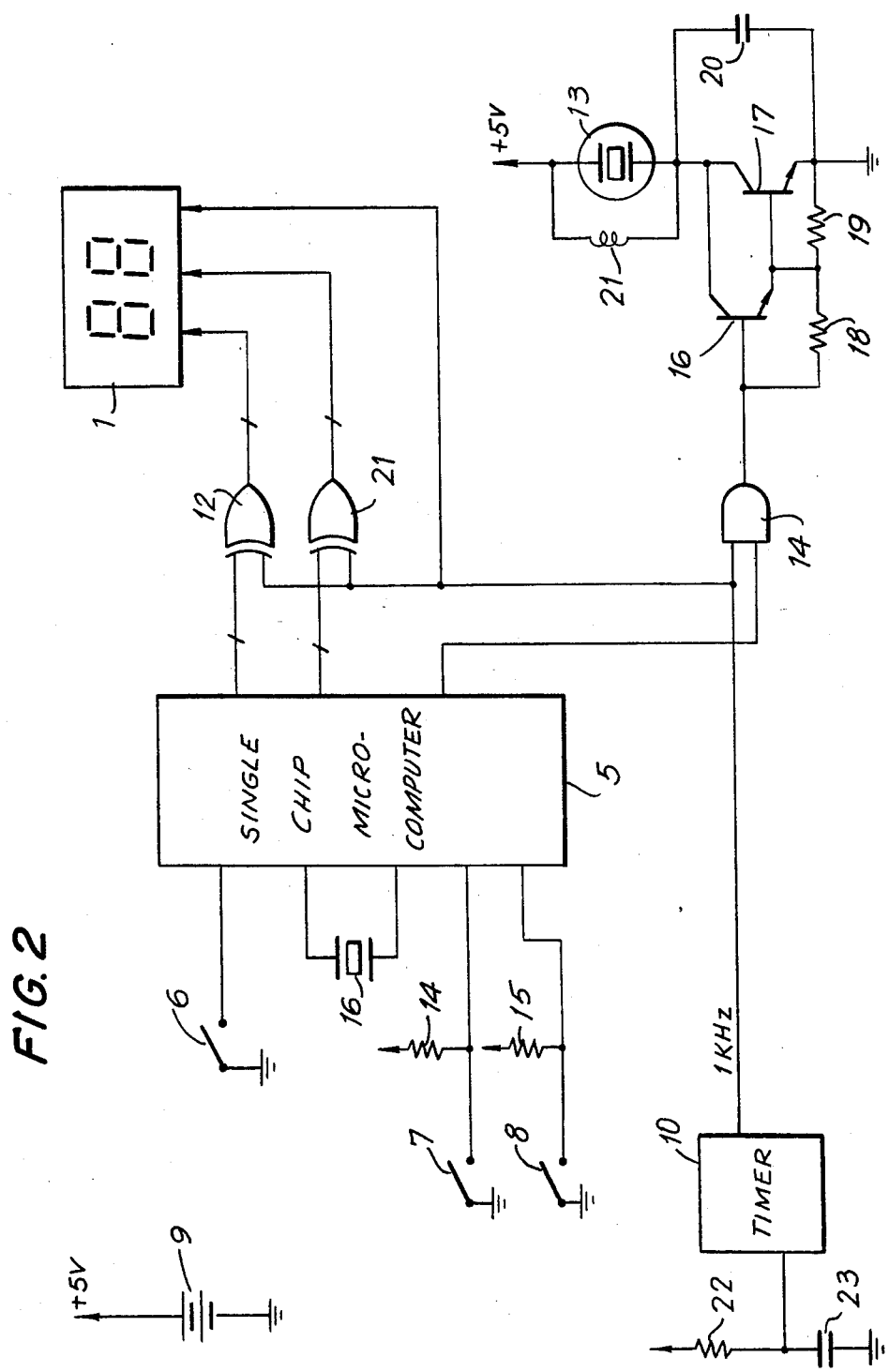
FIG. 2 is a schematic of the circuit of the timer of the present invention.

In the circuit of FIG. 2 a single chip microcomputer 5 controls all timing, handles inputs and outputs, and coordinates the interaction between the various elements of the circuit. One chip which may be used for all these functions is the Motorola MC6870545.

The clear buttons 6 resets microcomputer 5 clearing all registers and the readout. Test button 7 is included as an aide to the conditioning process. Pressing this button produces an immediate audio signal. The set button 8 allows the user to control the length of the timed interval. By pushing and releasing this button the user increments the interval by, for example, five minutes. Thus, using the aforementioned incremented value of five minutes, if one wishes the timed interval to be twenty minutes one pushes and releases the set button four times. The timer begins to count down automatically after the last release.

A small non-replaceable five volt battery powers the unit. The battery should last one to two years. It places appropriate voltages for various functions such as the test button 7 and set button 8 respectively through resistors 14 and 15.

A timer 10, which can be of the XR-555 type manufactured by EXAR, controls the frequency of the audio signal. Timer 10 receives its appropriate operating voltage through resistor 22 and also has a connection to ground capacitor 23. The digital readout 1 is a two digit liquid crystal device driven directly by the microcomputer 5. Two "EXCLUSIVE OR" gates 12 and 21 change the DC signal from the microcomputer 5 into a AC cycle which is required for efficient use of the digital readout 11.

"AND" gate 14 has an input from timer 10 and operates to generate an audio signal through element 13 when it receives a command from the microcomputer 5. The piezo element 13 can be of type PKD33EP manufactured by muRATA ERRIE. The interface between "AND" gate 14 and piezo element 13 is an amplifier circuit comprising transistors 16 and 17, resistors 18 and 19, and capacitor 20. An inductive element 21 is parallel with piezo element 13.

The aforementioned amplifier circuit tailors the electrical signals from the "AND" gate 14 such that the piezo element produces a sound of the appropriate frequency.

Item 16 is a timing crystal for the microcomputer 5.

The method of the present invention comprises the conditioning of the animal by both classical and operant techniques. A representative operant conditioning program for the pet is as follows. As previously stated, the object of the conditioning is to make the pet understand that, when it hears the timers audio signal, it should come home. The owner starts the conditioning with the pet in the same room. The owner holds the timer in his hand and sets off the audio signal by pressing the test button 3. After the signal has sounded the owner calls his pet to him. When the pet responds properly he is rewarded with a treat. The owner does this several times then repeats the process using the audio signal alone. Again the pet is rewarded with a treat for proper response. When the animal begins to respond correctly to the signal, the owner starts the second phase of the training. The timer is attached to the pet's collar and is set to go off after a short period, i.e., five to ten minutes. If the timer sounds and the pet comes to his owner, it is rewarded with a treat. The process is repeated until the animal responds correctly repeatedly.

The last step is the outside test. The owner sets the timer for a short interval and lets the animal out. If the animal responds correctly, it is rewarded and the conditioning process is complete. It should be noted that the owner must maintain the conditioning by rewarding the animal every time it responds correctly or the conditionng will cease to have an effect.

The flow diagram of FIG. 3 is self explanatory and need not be explained in detail. Its main elements illustrate that after the clear (reset) button 6 has been pushed the hardware is initialized with the display and alarm off and alarm is immediately generated if the test button 7 has been pressed and is generated after the appropriate incremental time periods have passed if the set button 8 has been pressed.

There is also a timer interrupt feature.

While the foregoing embodiment of the invention has been disclosed in considerable detail for purposes of illustration, it will be understood by those skilled in the art that many of these details may be varied without departing from the spirit and scope of the invention as stated in the appended claim.

What is claimed is:

1. A method of training an animal to return to a person through the use of an animal-borne timer having an audible alarm and test signal comprising, in the order listed, the steps of:

repeatedly initiating the timer test signal while the person calls the animal until the animal responds by returning to the person, rewarding the animal when it does so;

repeatedly initiating the timer test signal without the person calling the animal until the animal responds by returning to the person, rewarding the animal when it does so;

affixing the timer to the animal;

repeatedly setting the timer to various intervals of time until the animal consistently responds to the audible alarm by returning to the person, rewarding the animal when it does so;

and repeating the previous step with the animal initially located at a site remote from that of the person, rewarding the animal when it returns to the person in response to the alarm.

* * * * *